(12) United States Patent
Hinkel et al.

(10) Patent No.: US 6,192,985 B1
(45) Date of Patent: Feb. 27, 2001

(54) FLUIDS AND TECHNIQUES FOR MAXIMIZING FRACTURE FLUID CLEAN-UP

(75) Inventors: Jerald J. Hinkel, Houston; Kevin W. England, Longview, both of TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/216,420

(22) Filed: Dec. 19, 1998

(51) Int. Cl.[7] .......................... E21B 43/26; E21B 43/267
(52) U.S. Cl. ...................... 166/280; 166/300; 166/308; 507/202; 507/921
(58) Field of Search .................. 166/250.01, 250.1, 166/280, 300, 308; 507/202, 276, 277, 921

(56) References Cited

U.S. PATENT DOCUMENTS

| | | | |
|---|---|---|---|
| 3,245,470 | * | 4/1966 | Henry .................................. 166/280 |
| 4,078,609 | * | 3/1978 | Pavlich ................................ 166/271 |
| 4,249,609 | * | 2/1981 | Haafkens et al. ..................... 166/280 |
| 4,442,897 | * | 4/1984 | Crowell ............................... 166/280 |
| 4,506,734 | | 3/1985 | Nolte . |
| 4,701,247 | | 10/1987 | Kalnins et al. . |
| 4,702,848 | | 10/1987 | Payne . |
| 4,741,401 | | 5/1988 | Walles et al. . |
| 4,969,526 | | 11/1990 | Cawiezel . |
| 5,036,919 | | 8/1991 | Thomas et al. . |
| 5,074,359 | * | 12/1991 | Schmidt .............................. 166/280 |
| 5,103,905 | | 4/1992 | Brannon et al. . |
| 5,199,766 | * | 4/1993 | Montgomery .................... 166/308 X |
| 5,271,466 | * | 12/1993 | Harms ................................. 166/300 |
| 5,439,055 | * | 8/1995 | Card et al. .......................... 166/280 |
| 5,497,831 | * | 3/1996 | Hainey et al. ....................... 166/308 |
| 5,501,275 | * | 3/1996 | Card et al. .......................... 166/280 |
| 5,558,161 | * | 9/1996 | Vitthal et al. ....................... 166/280 |
| 5,782,300 | | 7/1998 | James et al. . |

OTHER PUBLICATIONS

SPE 38575 "Evaluation of the M–Site B–Sand Fracture Experiments: The Evolution of a Pressure Analysis Methodology", Gulrajani, et al, Oct. 1997.
SPE 36001 "The Migration of CADE Software for Oilfield Application to Laptop Computers", Ward, Jun. 1996.

* cited by examiner

*Primary Examiner*—George Suchfield
(74) *Attorney, Agent, or Firm*—Robin C. Nava; Maryam Bani-Jamali; Thomas Mitchell (57) ABSTRACT

The present Invention relates to method to stimulate the production of hydrocarbons from a subterranean formation. In particular, the present Invention discloses and claims methods to enhance the removal of fracturing fluid from a fracture deliberately created in the formation, thereby increasing effective fracture length, and thereby increasing hydrocarbon production. The methods of the present Invention involve breaker schedules opposite conventional teaching—i.e., according to the Invention, the breakers are staged such that the fluid near the fracture tip breaks first creating a viscosity gradient which causes the fluid resident in the tip to move towards the wellbore where it is more easily removed. Preferred embodiments of the Invention involve the use of gas to foam the fluid in the early pumping stages to induce a density gradient, as well as the use of fibrous material in the latter pumping stages to stabilize the proppant pack as the energized fluid in the near-tip squeezes through the near wellbore region.

33 Claims, 3 Drawing Sheets

FLUIDS AND TECHNIQUES FOR MAXIMIZING FRACTURE FLUID CLEAN-UP

BACKGROUND OF THE INVENTION

1. Technical Field of the Invention

The present Invention relates to method to stimulate the production of hydrocarbons from a subterranean formation. In particular, the present Invention discloses and claims methods to enhance removal of spent fracturing fluid from a fracture deliberately created in the formation, thereby increasing effective fracture length, and thereby increasing hydrocarbon production.

2. Introduction to the Technology

The present Invention relates generally to hydrocarbon (petroleum and natural gas) production from wells drilled in the earth. Obviously, it is desirable to maximize both the rate of flow and the overall capacity of hydrocarbon from the subsurface formation to the surface, where it can be recovered. One set of techniques to do this is referred to as stimulation techniques, and one such technique, "hydraulic fracturing," is the subject of the present Invention. The rate of flow, or "production" of hydrocarbon from a geologic formation is naturally dependent on numerous factors. One of these factors is the radius of the borehole; as the bore radius increases, the production rate increases, everything else being equal. Another, related to the first, is the flowpaths from the formation to the borehole available to the migrating hydrocarbon.

Drilling a hole in the subsurface is expensive—which limits the number of wells that can be economically drilled—and this expense only generally increases as the size of the hole increases. Additionally, a larger hole creates greater instability to the geologic formation, thus increasing the chances that the formation will shift around the wellbore and therefore damage the wellbore (and at worse collapse). So, while a larger borehole will, in theory, increase hydrocarbon production, it is impractical, and there is a significant downside. Yet, a fracture or large crack within the producing zone of the geologic formation, originating from and radiating out from the wellbore, can actually increase the "effective" (as opposed to "actual") wellbore radius, thus, the well behaves (in terms of production rate) as if the entire wellbore radius were much larger.

Fracturing (generally speaking, there are two types, acid fracturing and propped fracturing, the latter is of primary interest here) thus refers to methods used to stimulate the production of fluids resident in the subsurface, e.g., oil, natural gas, and brines. Hydraulic fracturing involves literally breaking or fracturing a portion of the surrounding strata, by injecting a specialized fluid into the wellbore directed at the face of the geologic formation at pressures sufficient to initiate and extend a fracture in the formation. More particularly, a fluid is injected through a wellbore; the fluid exits through holes (perforations in the well casing lining the borehole) and is directed against the face of the formation (sometimes wells are completed openhole where no casing and therefore no perforations exist so the fluid is injected through the wellbore and directly to the formation face) at a pressure and flow rate sufficient to overcome the minimum in-situ rock stress (also known as minimum principal stress) and to initiate and/or extend a fracture(s) into the formation. Actually, what is created by this process is not always a single fracture, but a fracture zone, i.e., a zone having multiple fractures, or cracks in the formation, through which hydrocarbon can flow to the wellbore.

In practice, fracturing a well is a highly complex operation performed with precise and exquisite orchestration of equipment, highly skilled engineers and technicians, and powerful integrated computers monitoring rates, pressures, volumes, etc. During a typical fracturing job, large quantities of materials often in excess of a quarter of a million gallons of fluid, will be pumped at high pressures exceeding the minimum principal stress down a well to a location often thousands of feet below the surface.

Figure 1:
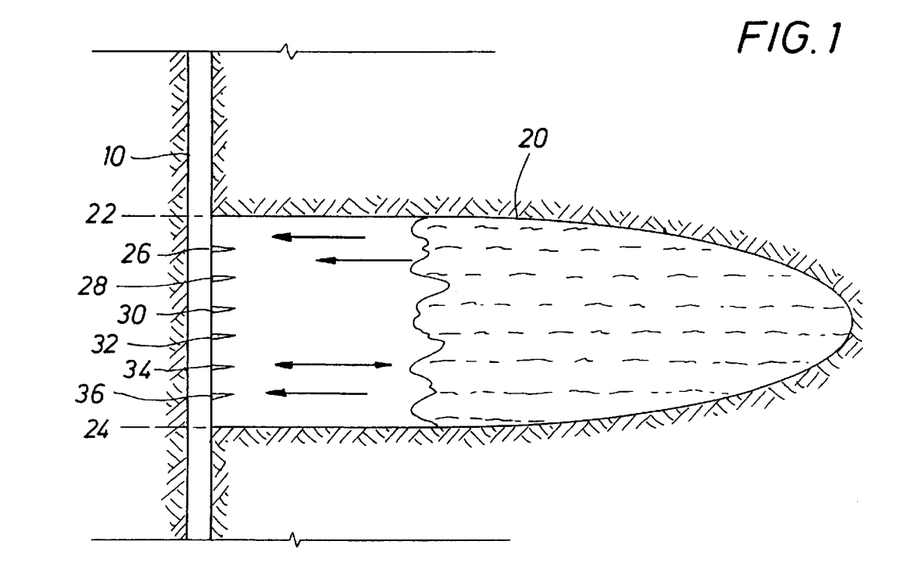
FIG. 1 depicts a stylized cross-sectional view of a typical fracture zone in a subsurface formation.

A typical fracture zone is shown in context, in FIG. 1. The actual wellbore—or hole in the earth into which pipe is placed through which the hydrocarbon flows up from the hydrocarbon-bearing formation to the surface—is shown at 10, and the entire fracture zone is shown at 20. The vertical extent of the hydrocarbon-producing zone is ideally (but not generally) coextensive with the fracture-zone height (by design). These two coextensive zones are shown bounded by 22 and 24. The fracture is usually created in the producing zone of interest (rather than another geologic zone) because holes or perforations, 26–36, are deliberately created in the well casing beforehand; thus the fracturing fluid flows down (vertically) the wellbore and exits through the perforations. Again, the reservoir does not necessarily represent a singular zone in the subterranean formation, but may, rather represent multiple zones of varying dimensions.

Thus, once the well has been drilled, fractures are often deliberately introduced in the formation, as a means of stimulating production, by increasing the effective wellbore radius. Clearly then, the longer the fracture, the greater the effective wellbore radius. More precisely, wells that have been hydraulically fractured exhibit both radial flow around the wellbore (conventional) and linear flow from the hydrocarbon-bearing formation to the fracture, and further linear flow along the fracture to the wellbore. Therefore, hydraulic fracturing is a common means to stimulate hydrocarbon production in low permeability formations. In addition, fracturing has also been used to stimulate production in high permeability formations. Obviously, if fracturing is desirable in a particular instance, then it is also desirable, generally speaking, to create as large (i.e., long) a fracture zone as possible—e.g., a larger fracture means an enlarged flowpath from the hydrocarbon migrating towards the wellbore and to the surface.

Yet many wells behave as though the fracture length were much shorter because the fracture is contaminated with fracturing fluid (i.e., more particularly, the fluid used to deliver the proppant as well as a fluid used to create the fracture, both of which shall be discussed below). The most difficult portion of the fluid to recover is that retained in the fracture tip—i.e. the distal-most portion of the fracture from the wellbore. Thus, the result of stagnant fracturing fluid in the fracture naturally diminishes the recovery of hydrocarbons. The reasons for this are both simple and complex. Most simply, the presence of fluid in the fracture acts as a barrier to the migration of hydrocarbon from the formation into the fracture. More precisely, the (aqueous-based fluid) saturates the pore spaces of the fracture face, preventing the migration of hydrocarbon into the same pore spaces, i.e., that fluid-saturated zone has low permeability to hydrocarbon.

Indeed, diminished effective fracture length caused by stagnant fluid retained in the fracture tip is perhaps the most significant variable limiting hydrocarbon production (both rate and capacity) from a given well. This is particularly true for low permeability gas reservoirs (approx. <50 millidarcys). The significance of this stagnant fluid on well productivity is evidenced by the empirical observation well known to the skilled reservoir engineer that effective fracture lengths (the true fracture length minus the distal portion of the fracture saturated with fracturing fluid) are generally much less than the true hydraulically-induced fracture length. To achieve an increase in effective fracture length—so that it approaches the true fracture length-therefore involves removing stagnant fracturing fluid from the fracture.

The deliberate removal of fracturing fluid from the fracture is known as "clean-up," i.e., this term refers to recovering the fluid once the proppant has been delivered to the fracture. The current state-of-the-art method for fracture clean-up involves very simply, pumping or allowing the fluid to flow out of the fracture—thus the fracture fluid residing in the tip must traverse the entire length of the fracture (and up the wellbore) to be removed from the fracture. The present Application is directed to an improved method—and compositions to execute that method—for clean-up of the fracture.

Figure 2:
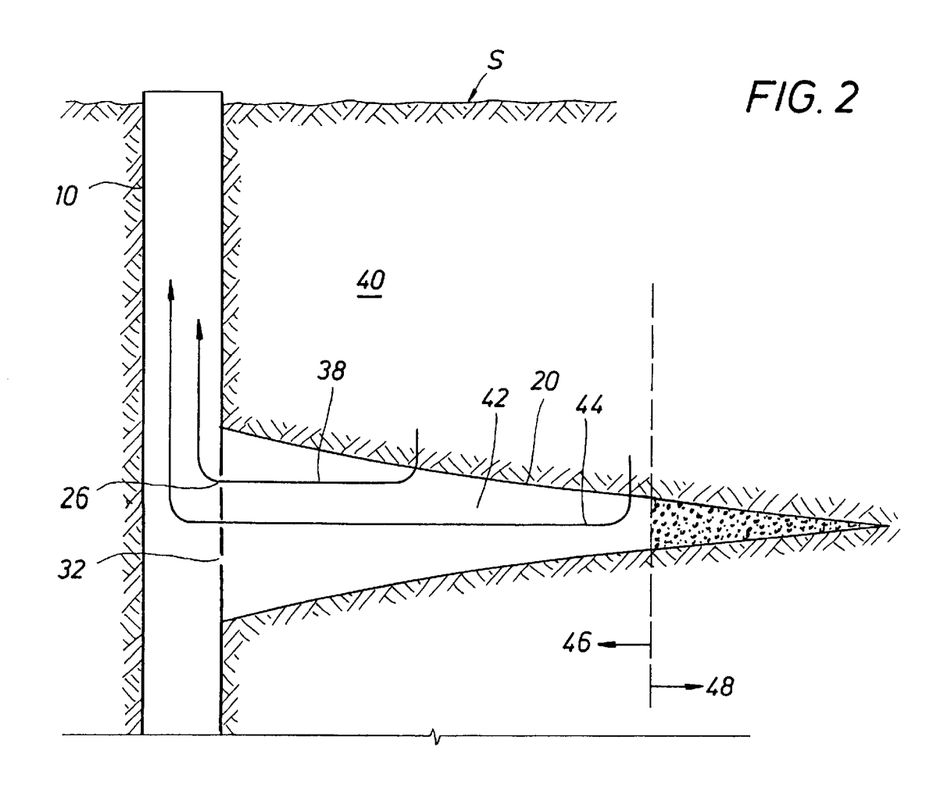
FIG. 2 depicts a cross-sectional view of a stylized fracture modified to show certain essential features of a typical fracturing operation.

Thus, the most difficult task related to fracture clean-up is to remove the stagnant fracture fluid retained in the fracture tip (i.e., farthest from the wellbore). Often, a portion of the fracture may be hydraulically isolated, or "cut-off" so that the hydrocarbon flowing from the formation into the fracture completely bypasses this tip region, as shown in FIG. 2. Ground level is shown at 5. The direction of hydrocarbon flow is shown at 38. Thus hydrocarbon flows-aided by the presence of the newly created fracture from the formation 40 into the fracture 42—traverses the fracture until it gets to wellbore 10 where it is recovered at the surface. A similar flowpath is shown at 44. These flowpaths can define two regions 46, a producing region, and 48, a non-producing region at the fracture tip that is isolated from the rest of the fracture since no hydrocarbon flows through this portion of the fracture, thus no pressure gradient exists. This phenomenon (in addition to others) ensures that the stagnant fracture fluid will remain in the fracture tip rather than being displaced by producing hydrocarbon, which can occur in the region shown at 46.

Generally speaking, creating a fracture in a hydrocarbon-bearing formation requires a complex suite of materials; four crucial components are usually required: a carrier fluid or proppant-carrying matrix, a viscosifier, a proppant, and a breaker. A fifth component is sometimes added, whose purpose is to control leak-off, or migration of the fluid into the fracture face. The first component is injected first, and actually creates/extends the fracture. Roughly, the purpose of these fluids is to first create/extend the fracture, then once it is opened sufficiently, to deliver proppant into the fracture, which keeps the fracture from closing once the pumping operation is completed. The carrier fluid is simply the means by which the proppant is carried into the formation. Numerous substances can act as a suitable carrier fluid, though they are generally aqueous-based solutions that have been either gelled or foamed or both. Thus, the carrier fluid is often prepared by blending a polymeric gelling agent with an aqueous solution (sometimes oil-based, sometimes a multi-phase fluid is desirable); often, the polymeric gelling agent is a solvatable polysaccharide, e.g., galactomannan gums, glycomannan gums, and cellulose derivatives. The purpose of the solvatable (or hydratable) polysaccharides is to thicken the aqueous solution so that solid particles known as "proppant" (discussed below) can be suspended in the solution for delivery into the fracture. Thus the polysaccharides function as viscosifiers, that is, they increase the viscosity of the aqueous solution by 10 to 100 times, or even more. During high temperature applications, a cross-linking agent is further added which further increases the viscosity of the solution. The borate ion has been used extensively as a cross-linking agent for hydrated guar gums and other galactomannans to form aqueous gels, e.g., U.S. Pat. No. 3,059,909. Other demonstrably suitable cross-linking agents include: titanium (U.S. Pat. No. 3,888,312), chromium, iron, aluminum and zirconium (U.S. Pat. No. 3,301,723). More recently, viscoelastic surfactants have been developed which obviates the need for thickening agents, and hence cross-linking agents, see, e.g., U.S. Pat. No. 5,551,516; U.S. Pat. No. 5,258,137; and U.S. Pat. No. 4,725,372, all assigned to Schlumberger.

The purpose of the proppant is to keep the newly fractured formation in the fractured state, i.e., from re-closing after the fracturing process is completed; thus, it is designed to keep the fracture open—in other words to provide a permeable path for the hydrocarbon to flow through the fracture and into the wellbore. More specifically, the proppant provides channels within the fracture through which the hydrocarbon can flow into the wellbore and therefore be withdrawn or "produced." Typical material from which the proppant is made includes sand (e.g. 20–40 mesh), bauxite, man-made intermediate strength materials and glass beads. The proppant can also be coated with resin to help prevent proppant flowback in certain applications. Thus, the purpose of the fracturing fluid generally is two-fold: (1) to create or extend an existing fracture through high-pressure introduction into the geologic formation of interest; and (2) to simultaneously deliver the proppant into the fracture void space so that the proppant can create a permanent channel through which the hydrocarbon can flow to the wellbore. Once this second step has been completed, it is desirable to remove the fracturing fluid from the fracture—its presence in the fracture is deleterious, since it plugs the fracture and therefore impedes the flow of hydrocarbon. This effect is naturally greater in high permeability formations, since the fluid can readily fill the (larger) void spaces. This contamination of the fracture by the fluid is referred to as decreasing the effective fracture length. And the process of removing the fluid from the fracture once the proppant has been delivered is referred to as "fracture clean-up." For this, the final component of the fracture fluid becomes relevant: the breaker. The purpose of the breaker is to lower the viscosity of the fluid so that it is more easily removed fracture. Nevertheless, no completely satisfactory method exists to recover the fluid, and therefore prevent it from reducing the effective fracture length. Again, fluid recovery after delivering the proppant to the fracture represents one of the major technological dilemmas in the hydrocarbon production field. The instant Invention is directed to methods for recovering the fracturing fluid once the fluid has successfully delivered the proppant to the fracture.

Diminished effective fracture length (EFL) caused by fracture fluid retention in the fracture is an empirically demonstrable problem that results in substantially reduced well yields. The EFL can be calculated by production decline and pressure transient analysis. The EFL values obtained this way can then be compared with the true fracture length obtained using standard geometry models.

Prior Art

Essentially, techniques for fracture clean-up, which again, refers to recovering the fracturing fluid (minus the proppant) from the fracture once it has delivered the proppant into the fracture, often involves reducing the fluid's viscosity as much as economically feasible—once the fluid has delivered the proppant into the fracture—so that it more readily flows back towards the wellbore. Again, the goal is to recover as much fluid as possible, since fluid left in the fracture reduces the effective fracture length. Among the most troublesome aspect of fluid recovery, or clean-up is recovering that portion of the fluid at the very tip of the fracture. Again, the fluid used to carry the proppant in to the matrix must have sufficient viscosity to entrain proppant particles. Yet once the proppant is placed in the fracture, it is desirable to get the fluid out, while leaving the proppant in place. Removing a viscous fluid from the fracture is difficult, therefore, fracturing fluids often contain additives to break the viscosity of the fracturing fluid once it has delivered the proppant into the fracture.

In summary, the genuine limiting factor in hydrocarbon production in low permeability reservoirs is the chronic inability to achieve suitable fracture clean-up. The goal in fracture clean-up is to achieve a suitable "effective" fracture length that approaches the true or actual fracture length. Thus, upon fracturing, fluid used to fracture the well remains in the fracture tip—this fluid prevents hydrocarbon production through that portion of the fracture. Therefore, numerous methods have arisen to address this problem. One potential solution is to simply create longer fractures (increase true fracture length which is bound to in turn increase effective fracture length). Longer fractures require greater expense to inject the fluid into the reservoir. At present, technology is near its cost-effective limit—that is, to create longer fractures would require new technology. Another possible solution is to obviate or at least diminish the need for fracture clean-up by pumping "cleaner" fluids—i.e., fluids with less polymer, and therefore which are less viscous, and therefore which are easier to flow back out of the fracture. This is a moderately acceptable solution; however low polymer fluids often means less proppant-carrying capacity, and therefore a smaller fracture. The overwhelming majority of candidate solutions lie within one of these two categories. The methods of the present Invention are directed to a third category: an improved method to remove fluid from the fracture tip. The present Invention is closely related to another application by the same inventors, Enhancing Fluid Removal From Fractures Deliberately Introduced into the Subsurface, U.S. patent application Ser. No. 09/087,286, assigned to Schlumberger.

SUMMARY OF THE INVENTION

Conventional wisdom teaches that during fracture clean-up, the fluid in the near-wellbore region must be removed from the fracture first, then the portions of the fluid more distal to the wellbore can be removed. Conventional wisdom also teaches that the fluid in the near tip region is essentially impossible to remove by anything even approaching a cost effective technique. Hence, effective fracture lengths about one-half of the true fracture lengths are acceptable in the industry (hence one half of the entire fracture length is filled with stagnant fracturing fluid therefore preventing hydrocarbon production through this region) despite the extraordinary drain they cause on overall hydrocarbon recovery.

The present Invention ignores these background assumptions. In place of those assumptions, the present Invention is based upon the premise that fluid near the fracture tip can be removed in a cost-effective way. More particularly, in the methods of the present Invention, the fluid resident in the fracture tip is removed first rather than last (as in conventional practice). Again, this is directly contradictory both to conventional practice an ordinary intuition since the fluid in the near-tip region is the farthest from the wellbore, from where all of the fluid must ultimately be removed. To achieve this in a cost effective way, conventional fluids and fluid additives can be used in the methods of the present Invention, though in highly novel combinations. Each method of the present Invention embodies the principle of inducing, then exploiting differential mobility of the fluid injected into the fracture. Thus, according to the present Invention, the fluid in the near-tip region is manipulated (based upon reservoir conditions) so that it has a greater mobility than the slab of fluid immediately proximal to it, that slab has a greater mobility than the slab of fluid immediately proximal to it, and so forth. The term "differential mobility" subsumes two primary mechanisms: differential viscosity (fluid movement in response to a viscosity gradient) and differential density (fluid movement in response to a den sity gradient). Methods of the present Invention can be referred to as "DM."

Preferred Embodiments of the present Invention, in addition to a non-uniform breaker schedule, involve foamed or energized fluids in the early pumping stages (near-tip region) and/or means to inhibit proppant flowback (e.g., fibers) in the late pumping stages. In other preferred embodiments, forced closure is used—i.e., soon after pumping, the well is flowed back to avoid as much as possible, fluid lost into the fracture face, and to encourage fluid movement along the fracture to the wellbore (i.e., to channel the fracturing fluid in the direction of the wellbore, rather than in the perpendicular direction, which is into the formation).

DETAILED DESCRIPTION OF THE PREFERRED EMBODIMENT

According to conventional practice, the breakers are selected so that flowback first occurs near the wellbore. In other words, the breakers are staged so that the highest concentration is in the portion of the fracture near the wellbore. That way, clean-up can occur as early as possible though this "clean-up" is only partial. The present Invention is entirely contrary to this orthodoxy. In essence, the present Invention is premised in part upon taking advantage of the energy that exists at the end of the fracturing job. More specifically, instead of staging the breakers so that the near-wellbore region breaks first, embodiments of the present Invention involve quick breaking in the tip region, and later breaking in the near-wellbore region. Once this happens, a viscosity gradient is created, and the fluid will move in response to that gradient. This is an effective means to remove difficult-to-remove fluid from the tip, since that portion of the fluid moves towards the wellbore towards a region of higher viscosity in response to a pressure potential gradient. Of course, the idea of staging breakers is not new, what is new is staging them in the opposite direction compared with conventional technology. "Staging breakers," which is a crucial concept of the present Invention embodies essentially three concepts. One, different types of breakers can be used during different stages of pumping so that the fluid in contact with each breaker type has a different viscosity. Two, different concentrations of the same type of breaker can be used to achieve the same effect. Or three, the temperature profile of the formation to be treated can be exploited to achieve the desired viscosity gradient (i.e., a hotter tip region will break fluid in that region compared with more proximal regions).

Thus, the present Invention is premised upon challenging a deeply embedded background assumption in the art and science of well stimulation. This assumption is that effective fracture length will be about one-half of the true fracture length-regardless of the effectiveness of the clean-up procedure applied, the fluid used, etc. Hence, the fluid that remained in the tip of the fracture is generally considered un-removable by any cost-effective means, particularly since this portion of the fracture is often hydraulically isolated from the rest of the fracture. Hence, the present Invention should dislodge that assumption by providing a technique for superior fracture tip clean-up, and therefore enhanced hydrocarbon production.

Definitions

As used herein, the term "breaker" refers to a chemical moiety or suite of moieties whose primary function is to "break" or reduce the viscosity of the proppant-carrying matrix. Typically, though not always, this occurs by oxidative reduction. According to conventional practice, the choice of breaker depends upon temperature. Exemplary breakers suitable for use with the present Invention include: bromate, persulfate, enzymes, copper ion, silver ion, acids (e.g., fumaric and nitric acid), and organic peroxide. In addition conventional breakers are commonly encapsulated to increase their effective temperature threshold. See, e.g., U.S. Pat. No. 4,741,401, Method for Treating Subterranean Formations, assigned to Schlumberger (disclosing selectively permeable encapsulated breakers that burst upon fluid intrusion), hereby incorporated by reference in its entirety. See also, e.g., U.S. Pat. No. 4,506,734, Fracturing Fluid Breaker System Which is Activated by Fracture Closure, assigned to The Standard Oil Company and licensed to Schlumberger (disclosing encapsulated breakers that burst due to pressure created by fracture closure). Also, electrochemical methods for breaking fracturing fluids are also operable in conjunction with the present Invention. See, U.S. Pat. No. 4,701,247, Electrochemical Methods for Breaking High Viscosity Fluids, assigned by Schlumberger, and hereby incorporated by reference in its entirety.

In addition, "breaker aids" are often used in conjunction with breakers to promote breaker activity. Breaker aids are disclosed in, e.g., U.S. Pat. No. 4,969,526, Non-Interfering Breaker System for Delayed Crosslinked Fracturing Fluids at Low Temperature, assigned by Schlumberger (disclosing and claiming triethanolarnine); and, U.S. Pat. No. 4,250,044, both U.S. patents are incorporated by reference in their entirety. Similarly, "retarding agents" (or materials designed to inhibit cross-linking are operable in conjunction with the present Invention. See, e.g., U.S. Pat. No. 4,702,848, Control of Crosslinking Reaction Rate Using Organozirconate Chelate Crosslinking Agent and Aldehyde Retarding Agent, assigned to Schlumberger (disclosing and claiming aldehydes), hereby incorporated by reference in its entirety. Both breaker aids and cross-link retarding agents are fully operable in conjunction with the present Invention. Again, the crux of the present Invention lies not in absolute breaker activity, but in relative activity—i.e., comparing breaker activity within different stages. Yet as evidenced by the preceding discussion, treatments can be designed in accordance with the present Invention that rely not on manipulating the activity of the breakers directly, but on indirect manipulation: e.g., retarding agents and breaker aids. In addition, the different fluids can be used without regard to breaker type—e.g., injecting in a first stage a less viscous and/or less dense fluid followed by fluids of greater mobility. See, e.g., U.S. Pat. No. 5,036,919, Fracturing With Multiple Fluids to Improve Fracture Conductivity, assigned by Schlumberger, and hereby incorporated by reference in its entirety. The '919 patent claims and discloses, for instance, pumping a zirconate cross-linked fluid followed by a borate cross-linked fluid. Hence, the present Invention is operable not just by modulating fluid viscosity and density through breaker activity, but it is also operable using different fluids altogether in different stages of the treatment. In other words "differential mobility" subsumes this concept as well.

Additionally, the present Invention is readily operable in conjunction with conventional fracture design. See, e.g., U.S. Pat. No. 5,103,905, Method of Optimizing the Conductivity of a Propped Fractured Formation, assigned by Schlumberger, hereby incorporated by reference in its entirety.

As used herein the term "activity," as in "high-activity breaker" refers either the ability to break (reduce the viscosity) of the proppant-carrying matrix. Hence, activity is a function of either chemistry or concentration. For instance, bromate has a different activity than persulfate; similarly, a greater concentration of bromate has a greater activity than a lower concentration of bromate. In addition, activity can be modulated by encapsulating the breaker (e.g., the '734 patent).

As used herein, the term "gas," "foam," "and energized fluid," shall have the following meaning. In particularly preferred embodiments of the present Invention, the early stages of fluid (in the near-tip region of the fracture) are foamed. The purpose for doing this is at least two-fold. One, the entrained gas will create small flow channels through which the less viscous fluid in the near-tip region can migrate more easily through the more viscous fluid and towards the wellbore. Second, the foam, juxtaposed with the non-foamed fluid more proximal to the wellbore, creates a density gradient; thus, the less dense (foamed) fluid in the near-tip region moves from the tip towards the wellbore in response to this density gradient. Third, upon leak-off of the fracturing fluid, the presence of gas prevents 100% water saturation in the adjacent formation. The term "gas" has its ordinary dictionary meaning-preferred embodiments include carbon dioxide, air, and nitrogen. The term "foam" refers to gas entrained within proppant-carrying matrix (the liquid is the continuous phase, the gas is the discontinuous phase). Typically, the gas content (by volume compared with the co-mixed liquid) is between about 90% and about 25%. Below about 25% gas, the mixture (gas and proppant-carrying matrix) is referred to herein as an "energized fluid."

As used herein, the term "proppant-carrying matrix" refers to the fluid used to deliver the proppant into the fracture. Conventional fluids include guar and modified guar systems (e.g., carboxymethyl hydroxypropyl guar) and non-polymeric fluids such as viscoelastic surfactants, such as ClearFRAC.

As used herein, the term "differential mobility" refers to a fluid's potential to move in response to one or more gradients—in the present Invention, these gradients are generally deliberately induced and are primarily a viscosity gradient, and in preferred embodiments, also a density gradient. The present Invention is operable not just by modulating fluid viscosity and density through breaker activity, but it is also operable using different fluids altogether in different stages is of the treatment (e.g., the '919 patent). In other words "differential mobility" subsumes this concept as well. In addition, the concept of differential mobility subsumes a third type of differential fluid activity (one being viscosity, the second being density), which relates to the relative interfacial tension between two fluids. For instance, the skilled treatment designer may wish to design a DM treatment in which a near-tip fluid stage is a hydrocarbon (e.g., diesel or kerosene) either in pure form or emulsified. The interfacial tension between this fluid stage and the adjacent fluid stage (more proximal to the wellbore) which is generally a water-based fluid, is low, and therefore the hydrocarbon fluid will migrate towards the wellbore in response to this potential gradient established by the region of low interfacial tension. Thus, "differential mobility" subsumes this concept as well.

As used herein, the term "means for controlling proppant flowback" (used for the first time herein) means any material recited in patents incorporated by reference and recited below (e.g., U.S. Pat. Nos. 5,782,300) which are disclosed as materials suitable for controlling proppant flowback. Such materials include, though are not limited to: NOVALOID (either fibers or platelets), NOVALOID-type polymer materials, glass fibers, and metal filaments. Particularly preferred embodiments of the present Invention incorporate NOVALOID fibers having dimensions of about 10 mm (length) and about 30 microns (diameter).

Particularly Preferred Embodiments

Three particularly preferred sets of embodiments of the present Invention will now be discussed (treatments in accordance with the present Invention are referred to as "DM treatments). In one, during at least one early stage (i.e., the fluid injected into the fracture tip) the fluid is foamed using a gas, such as nitrogen, or carbon dioxide (either is preferred in methods of the present Invention). Once in the fracture tip, the gas will blow out of the foam, and therefore creating channels parallel to the fracture through which the fluid can flow towards the wellbore with far less resistance.

Performing this preferred DM treatment (i.e., early stage foam). One, this prevents water saturation in the tip from reaching 100% (which would completely inhibit hydrocarbon movement into the tip). Second, foam inhibits fluid leak-off.

In a second set of preferred embodiments, during at least one of the latter stages of pumping (to place fluid in the portion of the fracture near the wellbore) PropNET™ or PropNET GOLD (trademarks of Schlumberger) or a similar material, is added to the fluid. The purpose of PropNET is to stabilize the proppant, or to avoid proppant flowback. Hence the near-wellbore proppant is stabilized (by the addition of fibers, for instance) so that the (more mobile) fluid originally placed in the tip region can squeeze through as it moves towards the wellbore, without displacing the proppant pack. The desire for such a material is greater for the technique of the present Invention, since the fluid will be flowing back towards the wellbore with greater force than in the case of conventional techniques. PropNET GOLD is described in U.S. Pat. No. 5,782,300, Suspension and Porous Pack for Reduction of Particles in Subterranean Well Fluids, and Methods for Treating an Underground Formation, assigned to Schlumberger. PropNET is described in U.S. Pat. No. 5,330,005, Control of Particulate Flowback in Subterranean Wells, assigned to Schlumberger. Both patents are incorporated by reference in their entirety, with particular attention to the fiber compositions and the methods of placing said fibers (e.g., '300 patent: fiber types, col. 4, 1. 37, methods, col. 5, 1. 65). Also, particular attention is directed to columns 3 and 4, which consist of an introduction to the preferred compositions of PropNET™ and its preferred applications. Also disclosing proppant flowback control means and incorporated by reference in their entirety are U.S. Pat. Nos. 5,330,095; 5,439,055; and 5,501,275 (each is cited in the '300 patent).

Essentially, PropNET and other means for controlling proppant flowback consists of placing fibrous materials (e.g., 16 micron glass fibers) in intimate contact with the proppant particles. The fibers act to bridge across constructions and orifices in the proppant pack, and therefore stabilize the proppant pack with little or no minimal effect on proppant conductivity.

Naturally, other DM treatments may involve both foam at an early stage and a suitable means for proppant flowback at a late stage. Similarly, DM treatments may also involve a breaker schedule based on a single breaker having different concentrations, or a breaker schedule having different types of breakers at different stages. Finally, in other preferred DM treatments, one can adjust breaker activity even if the same breaker at the same concentration is used, by adding a breaker aid. Therefore, the primary variables used to design breaker schedules in accordance with the present Invention include: foam, fibers, breaker concentration, breaker type, and breaker aid type and concentration.

In addition, in each of the sets of embodiments discussed above, "forced closure" is particularly preferable. The conventional practice in hydraulic fracturing is to immediately shut the well in, after creating the fracture and placing the proppant pack. By shutting the well in, it is closed off to the atmosphere and therefore under pressure. Hence, the pressure in the fracture bleeds off gradually as the fluid resident in the fracture leaks off from the fracture through the fracture face and into the formation. In particularly preferred embodiments of the present Invention, the opposite practice is employed. More particularly, in preferred DM treatments immediately after (or shortly thereafter) pumping, the wellhead is opened to the atmosphere. As a result of this, the fracture closes more quickly as the pressure bleeds off to the atmosphere; and therefore, the fracturing fluid is aggressively forced out of the fracture. In conjunction with late stage(s) containing fibers and early stage(s) containing gas, forced closure is a particularly preferred method of the present Invention.

Again, the present Invention relates to novel techniques and compositions for increasing the effective fracture length. The mechanism by which effective fracture length is increased is by enhanced fluid removal from the fracture tip, in turn achieved through creating then exploiting a viscosity gradient in the direction of the fracture or transverse to the wellbore. The viscosity gradient is created by selecting the appropriate suite of breakers (or substances which destroy the cross-link structure of the polymer).

The mechanism by which the present Invention is believed to operate is as follows. The staged breaker—either breakers of different concentration or different types of breakers, or both—give rise to portions of fluid within the fracture having different viscosities relative to one another. Ideally, the fluid injected into the tip of the fracture (stage 1, or the first-injected stage) breaks first, at which point this fluid has a lower viscosity than the contiguous slab of fluid more proximal to the wellbore. As a result of this gradient, the low viscosity (low mobility) fluid moves in the direction of the wellbore. Again, this movement in response to a gradient can be assisted by foaming the first stage. Hence, the foam will not only decrease the fluid density and therefore establishing a density gradient, but the foam will also create channels through which the near-tip fluid can travel in the direction of the wellbore. The term "mobility" thus refers to movement in response to a viscosity reduction or a density reduction or both—as well as a gradient based on interfacial tension (e.g., in the case of hydrocarbons or hydrocarbon emulsions).

Practically speaking, executing DM treatments requires selecting an appropriate breaker schedule. As the skilled engineer will readily understand, this selection will vary drastically from one fracturing treatment to the next. The primary factor that dictates breaker type and concentration is the temperature profile, i.e., the temperature of the reservoir, which influences the temperature (and therefore the stability or viscosity) of the fluid pumped into the formation.

EXAMPLE 1

This example illustrates DM treatments used in conjunction with a typical hydraulic fracturing job. The fracturing fluid selected is CMHPG (carboxymethylhydroxypropyl guar), a modified guar system. The proppant is 20/40 mesh Northern White Sand. The pumping schedule is divided into nine different stages. Table 1 below depicts the schedule more precisely (since breaker amounts are given in concentrations, i.e., #/1000 gal., total amounts of fluid pumped, etc. are omitted).

| Temperature | Stage | Breaker Type | Breaker Concentration | Additives |
|---|---|---|---|---|
| 300 | 1 | encapsulated bromate | 2 | Nitrogen gas |
| 275 | 2 | encapsulated bromate | 1 | |
| 250 | 3 | encapsulated bromate | 0.5 | |
| 225 | 4 | un-encapsulated bromate | 2 | |
| 200 | 5 | encapsulated persulfate | 2 | |
| 175 | 6 | encapsulated bromate | 1 | |
| 150 | 7 | encapsulated bromate | 0.5 | |
| 125 | 8 | encapsulated bromate | 0.5 | PropNET GOLD |
| 100 | 9 | persulfate | 1 | PropNET GOLD |

As evidenced, by Table 1, PropNET GOLD is relied upon to prevent proppant flowback (i.e., the means for controlling proppant flowback). Again, the precise selection of breakers is dictated by the fluid temperature which is in turn dependent upon the formation temperature. The novelty of the present Invention does not reside in a particular suite of breakers; indeed, any combination of breakers and or breaker combinations that induce a viscosity gradient in the fracturing fluid, such that the region of lowest viscosity is in the tip region, and the region of highest viscosity is in the near-wellbore region, and that yields an otherwise operable DM treatment (which the skilled engineer will easily be able to discern), lies within the ambit of the present Invention. Put another way, having thus defined the objectives of the Invention, any particular combination of breakers—which the skilled engineer will easily be able to discern—that achieves the stated objectives of the present Invention, are interchangeable with the particular embodiments specifically described herein. Enzyme breakers, for instance, are also operable in other DM treatments.

After the pumping schedule of Table 1 is followed, the well is shut in. The well is flowed back much more quickly that in conventional practice, in this case, about one hour after closure is preferred. The fluid near the tip breaks quickly, reducing its viscosity, thereby creating a viscosity gradient, since more viscous fluid is in the near-wellbore region, and less viscous fluid is in the tip. The fluid therefore moves in response to this gradient, which in this instance, means that it moves in the direction of the wellbore, thereby facilitating clean-up.

In this Example, the first stage is foamed with nitrogen gas. Gas in the tip region (only) creates another mobility differential which further assists the fluid to move from the tip towards the wellbore.

Using the protocol in Example 1 will result in enhanced fluid removal from the fracture tip, therefore a greater effective fracture length, and therefore greater hydrocarbon recovery

EXAMPLE 2

Like Example 1, this Example recites a typical DM treatment design, though in substantially more detail than in Example 1. FracCADE™ fracture design software preferably used, though it is not required. (trademark of Schlumberger, the FracCADE product was created and is currently sold by Schlumberger). See, V. W. Ward, *The Migration of CADE Software for Oilfield Services Application to Laptop Computers*, SPE 36001, presented at the 1996 SPE Petroleum Computers Conference, Dallas Tex., 1996; S. N. Gulrajani, et al., *Evaluation of the M-Site B-Sand Fracture Experiments: The Evolution of a Pressure Analysis Methodology*, SPE 38575, presented at the 1997 Annual Technical Conference and Exhibition, San Antonio, Tex., 1997; both papers are hereby incorporated by reference in their entirety.

To design a DM treatment, as in conventional treatments, a reasonably accurate estimate of bottom hole static temperature (BHST) is required. The other primary considerations are the fluid exposure times (for each stage, based on pumping rates and volumes) and the minimum viscosity required to deliver the desired proppant concentration. Programs such as FracCADE can also predict from this information, the temperature in the fracture (hence the fluid temperature) at various time intervals in the pumping schedule. Thus, using a FracCADE or a more simple iterative mathematical model, a table of values can be obtained for different stages of pumping such as Table 2, below:

| Stage Name | Fluid Type | Pump Rate (bbl/min) | Fluid Volume (gal) | Perforation Inj. Temp (F.) | Exposure at BHST of 250° F. | Exposure at Temp of 200° F. |
|---|---|---|---|---|---|---|
| Pad | guar, zirconate cross-linked, 40 lbs. guar/1000 gal. of fluid | 45.0 | 100,000 | 90 | 76.5 | 90.3 |

-continued

| Stage Name | Fluid Type | Pump Rate (bbl/min) | Fluid Volume (gal) | Perforation Inj. Temp (F.) | Exposure at BHST of 250° F. | Exposure at Temp of 200° F. |
|---|---|---|---|---|---|---|
| 2 PPA | guar, zirconate cross-linked, 40 lbs. guar/1000 gal. of fluid | 45.0 | 9,000 | 82 | 49.5 | 67.0 |
| 3 PPA | guar, zirconate cross-linked, 40 lbs. guar/1000 gal. of fluid | 45.0 | 12,000 | 82 | 43.7 | 61.2 |
| 4 PPA | guar, zirconate cross-linked, 40 lbs. guar/1000 gal. of fluid | 45.0 | 14,000 | 82 | 34.8 | 55.4 |
| 5 PPA | guar, zirconate cross-linked, 40 lbs. guar/1000 gal. of fluid | 45.0 | 18,000 | 82 | 23.1 | 43.7 |
| 6 PPA | guar, zirconate cross-linked, 40 lbs. guar/1000 gal. of fluid | 45.0 | 22,000 | 82 | 5.8 | 31.8 |
| 7 PPA | guar, zirconate cross-linked, 40 lbs. guar/1000 gal. of fluid | 45.0 | 25,000 | 82 | 0 | 14.4 |
| 8 PPA | guar, zirconate cross-linked, 40 lbs. guar/1000 gal. of fluid | 45.0 | 20,000 | 82 | 0 | 0.0 |
| Flush | guar, non-cross-linked, 40 lbs. guar/1000 gal. of fluid | 45.0 | 5,956 | | | |

Once the fluid exposure time has been determined, the proper amount of breaker needed in each stage to achieve the desired viscosity for the calculated temperature is determined. This can be done, for instance, by referring to predetermined fluid rheology profiles such as in FIG. 3. As evidenced by FIG. 3, rheology profiles of this sort typically display fluid viscosity as a function of temperature for a given fluid type and temperature. A single curve corresponds to a single breaker type at a given concentration. So, by selecting the desired viscosity and the fluid exposure time, the treatment designer then selects the breaker and concentration that corresponds to the curve nearest the intersection of the exposure time and desired viscosity.

Therefore, the skilled treatment designer can for instance follow these steps to design a DM treatment. First, select a minimum viscosity requirement for the fracturing fluid selected-ideally this is done for each stage. For instance, the designer may decide that a fluid having a 50 centipoise viscosity is needed to transport the desired concentration of proppant. This can be done with modeling software such as FracCADE. Next, the fluid exposure times for each stage is determined, based on pumping rates, etc. At this point, the designer can rely upon predetermined fluid rheology profiles to select the proper breaker and breaker concentration.

The difference between DM treatments and conventional treatments is that the minimum viscosity selected is higher in the latter pumping stages. At the same time it is lower in the earlier pumping stages (near-tip region) are preferred compared with conventional practice. Yet the fluid in the tip is the hottest and it has the longest exposure time. Therefore, regardless of whether conventional practice or the method of the present Invention is used, the concentration of breaker cannot be too high—if it is, then the fluid will break prematurely and inhibit fracture extension. Therefore, the breaker type and concentration in the methods of the present Invention and conventional methods may be roughly equal. The difference between the two is that in the latter, breaker activity is increased (by concentration of changing breaker type) in the latter stages, whereas in the former methods, breaker activity is decreased to achieve the mobility gradient. Again, conventional wisdom dictates high breaker concentrations in the latter stages so that the fluid near the wellbore breaks as much as possible. The rationale for this is questionable, particularly in light of the present Invention, but it is the prevailing orthodoxy nonetheless. The present Invention disregards that orthodoxy while still subsuming methods which are operable with conventional fracturing fluids and breakers.

Therefore, designing preferred DM treatments involves determining exposure times for the fracturing fluid chosen (based on pumping rate, etc.) in particular for each fluid stage, and then examining the relevant set (for that fluid at a given temperature) of rheology profiles (viscosity versus time) to select a breaker activity (type and/or concentration) from those profiles ensuring that the fluid viscosity at end of pumping for each stage is higher than the stage that immediately preceded it. Table 3 below compares a conventional treatment design with a treatment of the present Invention.

| Stage Name | Fluid Type | Fluid Volume | Perforation Inj. Temp (F.) | Conventional Design: breaker conc. (potassium bromate) | DM Design: breaker conc. (potassium bromate) |
|---|---|---|---|---|---|
| Pad | guar, zirconate cross-linked, 40 gal guar/1000 gal of fluid | 100,000 | 90 | 4.0 | 4.0 |

-continued

| Stage Name | Fluid Type | Fluid Volume | Perforation Inj. Temp (F.) | Conventional Design: breaker conc. (potassium bromate) | DM Design: breaker conc. (potassium bromate) |
|---|---|---|---|---|---|
| 2 PPA | guar, zirconate cross-linked, 40 gal guar/1000 gal of fluid | 9,000 | 82 | 5.0 | 3.0 |
| 3 PPA | guar, zirconate cross-linked, 40 gal guar/1000 gal of fluid | 12,000 | 82 | 6.0 | 2.5 |
| 4 PPA | guar, zirconate cross-linked, 40 gal guar/1000 gal of fluid | 14,000 | 82 | 6.5 | 2.0 |
| 5 PPA | guar, zirconate cross-linked, 40 gal guar/1000 gal of fluid | 18,000 | 82 | 7.0 | 1.5 |
| 6 PPA | guar, zirconate cross-linked, 40 gal guar/1000 gal of fluid | 22,000 | 82 | 8.0 | 1.0 |
| 7 PPA | guar, zirconate cross-linked, 40 gal guar/1000 gal of fluid | 25,000 | 82 | 10.0 | 0.5 |
| 8 PPA | guar, zirconate cross-linked, 40 gal guar/1000 gal of fluid | 20,000 | 82 | 10.0 | 0 |
| Flush | guar, non-cross-linked, 40 lbs. guar/1000 gal. of fluid | 5,956 | | | |

Figure 3:
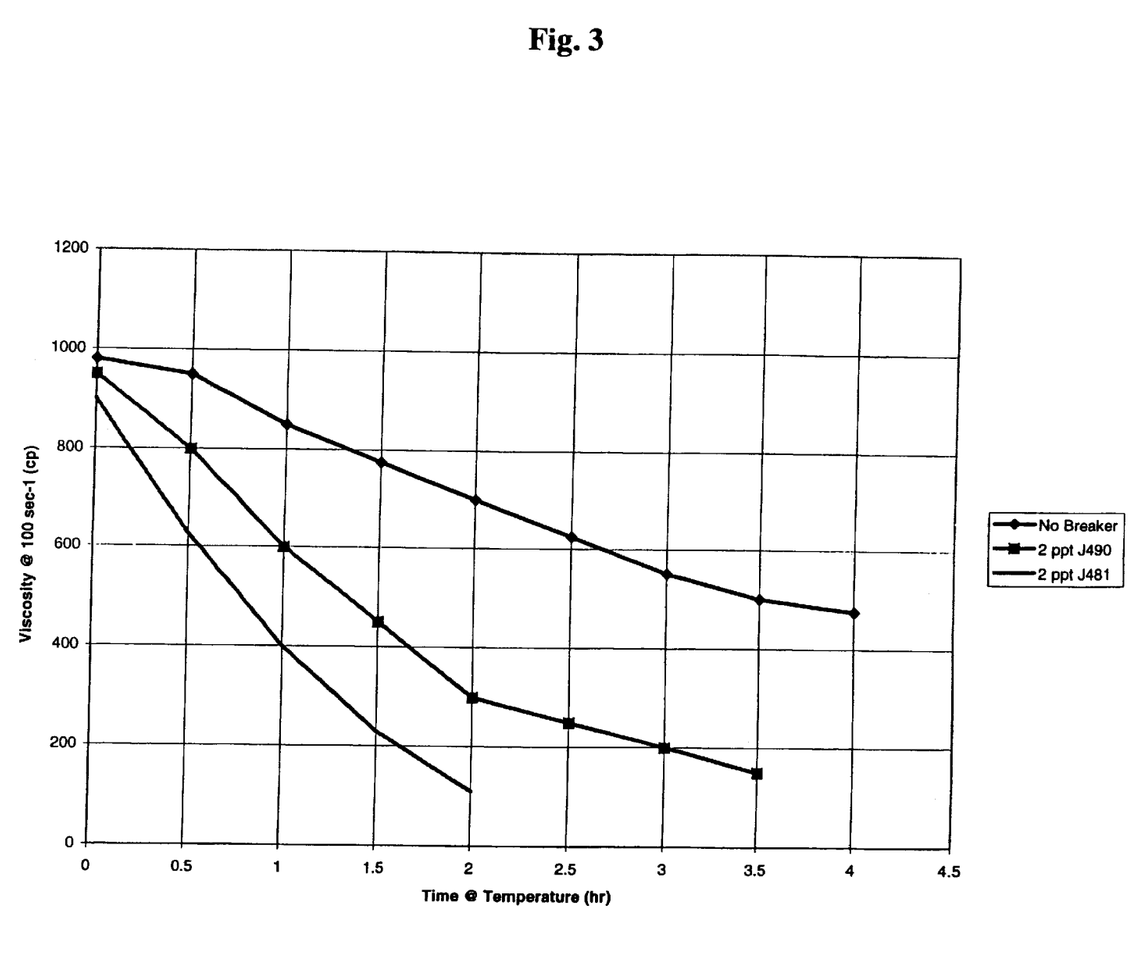
FIG. 3 depicts a typical rheology profile for two different breaker types (plus one curve with no breaker). These pre-determined curves can be used to select the proper breaker type and concentration.

As evidenced by FIG. 3, the Pad stage for both designs has equal breaker concentrations. The reason for this is that, while a high breaker concentration is, in theory, desirable in fracture design according to the present Invention, practically speaking, the fluid in the tip is exposed to the highest temperature and has the longest residence time in the fracture. Therefore, whether conventional or the methods recited herein are used, the breaker concentration in the tip is constrained—i.e., it cannot be too high, otherwise, the fluid in the tip will break prematurely and the fracture won't extend properly.

In other particularly preferred DM treatments, the skilled treatment designer may wish to avoid adding any breaker whatever to the pad fraction(s). The reason is that the pad fluid (in theory) completely leaks off into the formation, and with it, the breaker mixed with the fluid. Similarly, the long residence time for the proppant-carrying fluid (after pad) in the near-tip region can result in substantial leak-off. To avoid this, or to mitigate it, the skilled treatment designer may wish to energize or foam these stages. Thus foaming/energizing the early stages has two advantages exploited by the present Invention: (1) it lowers the fluid density therefore increasing the mobility differential; and (2) it lowers leak-off. Moreover, gas prevents the adjacent formation from achieving 100% water saturation.

Referring again to FIG. 3, and in particular the column showing the breaker schedule for a conventional design, the skilled treatment designer will recognize that breaker type and concentration were selected (again, from the rheology profiles) so that at the end of pumping, each fluid stage has approximately the same viscosity (or at least so that each stage has as low a viscosity as possible). By contrast, breaker schedules in DM treatments are selected with the exact opposite criterion: so that fluid viscosity is not the same across stages but increases as you move from the tip towards the wellbore.

Figure 4:
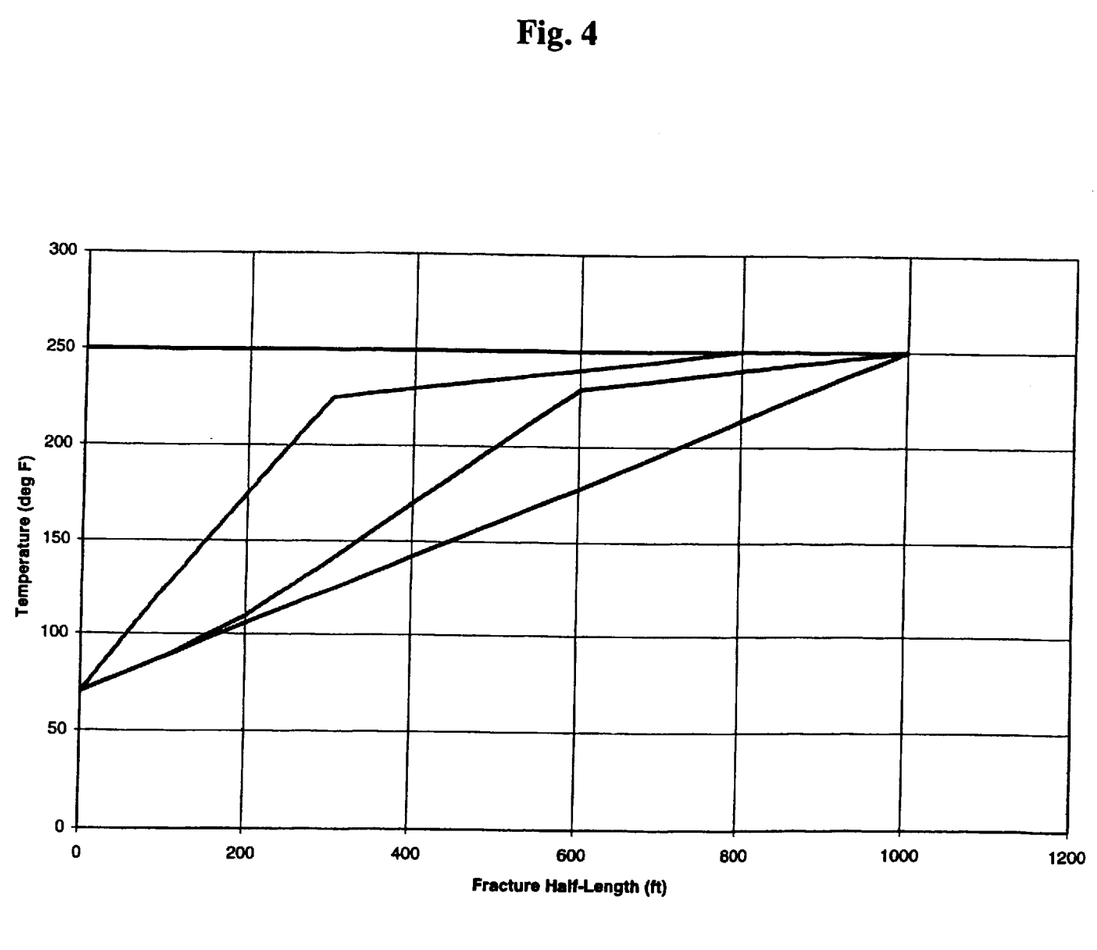
FIG. 4 depicts four separate plots (representing four different formation types) of fluid temperature as a function of distance from the wellbore (location within the fracture).

Finally, FIG. 4 shows four separate plots (each plot representing a different formation type) of fracturing fluid temperature as a function of distance form the wellbore. In designing fracturing treatments according to the present Invention, the skilled treatment designer may elect to refer to such a figure. Depending upon which of these four curves most closely approximates the actual profile of the formation to be fractured, the DM treatment design will vary. Thus, if the formation yields a profile similar to the dark horizontal line (intersecting the y axis at about 250° F.) then the treatment designer should vary the breaker activity to a greater extent than if the formation yields a profile similar to the one closest to the bottom of FIG. 4. In that latter instance, the formation itself will intrinsically induce a viscosity gradient (low near the tip and increasing as you move towards the wellbore), therefore the breaker activity may be varied less drastically compared with the former case. In any event, the key feature of DM treatments is deliberate manipulation of fluid mobility (viscosity and density) so that mobility varies among fluid stages in such a way that a positive gradient is induced which can be exploited to remove fluid from the fracture tip.

EXAMPLE 3

General Fracture—Treatment Design using the Methods of the Present Invention

The skilled treatment designer no doubt realizes that the particular breaker schedule for a DM treatment cannot be specified a priori, with particularity, but instead depends upon the particular geologic formation to be treated. In this example, we shall outline the essential parameters necessary to design a fracturing treatment in accordance with the present Invention.

Again, the present Invention is premised upon establishing a mobility differential so that the fluid in the near-tip region moves in response to that gradient towards the wellbore. In DM treatments, the mobility differential is primarily established by creating a viscosity gradient and in particularly preferred embodiments, a density gradient also. Hence, the near-tip fluid is chemically altered so that it has a lower viscosity, and in other embodiments, it is also foamed so that it has a lower density. Below that level of generality, the particular choice of breakers, breaker concentrations, and what stages of pumping to add which breakers depends numerous factors unique to the particular geology and geochemistry of the reservoir. Yet the primary factor that influences breaker schedule design in accordance with the present Invention is the temperature profile of the reservoir. Such a profile can be obtained by mathematical models embodied in software, such as FracCADE. In any event, the model used can be simple or complex, but the goal is to estimate as closely as possible the end-of-job (i.e., end-of-pumping) profile (i.e., fluid temperature as a function of the distance from the wellbore at the instance pumping ceases). The parameters used to estimate this profile are generally: initial bottom hole static temperature (usually readily available prior to a fracturing treatment from wireline measurements), fracturing fluid properties (specific heats, and their conductivities) and formation/rock properties (specific heat and conductivity).

So for instance, if the temperature profile is such that the wellbore temperature heats up quickly, then the treatment designer may wish to use a single breaker but vary the concentrations of that single breaker (higher near the tip, lower towards the wellbore). The reason for this is that cooling occurs due to leak-off (movement of the fracturing fluid into the formation) as the formation returns to its pre-fracturing, equilibrium or steady-state temperature.

EXAMPLE 4

Verifying the Success of Treatments Based on the Present Invention

The effectiveness of DM treatments are simple to verify in actual field applications. For instance, a tracer study can be performed whereby small amounts of tracers are added to different stages of the fracturing fluid. If the method of the present Invention is operable then the tracer study should indicate the first fluid injected flows back sooner compared with the remainder of the fluid, compared with conventional treatments.

Again, the goal of the present Invention is to increase effective fracture length (so that it approaches, as much as possible) the true fracture length. If the method of the present Invention is operable, then a larger effective fracture length should result. A number of methods are presently available to estimate this quantity, which can all be relied upon to validate treatments of the present Invention.

In addition, other less direct indicia can be tentatively relied upon to assess the effectiveness of DM treatments: improved production, fracturing fluids returned during flowback are warmer than expected, and calculated longer effective fracture length from pressure transient analysis or another model (e.g., Post Closure Analysis incorporated in FracCADE).

Having described the invention, we claim:

1. A method for fracturing a subterranean formation comprising sequentially injecting into a wellbore, fracturing fluid thereby creating a fracture, said fluid comprising a suite of breakers or a single breaker at varying concentrations, to induce a mobility gradient, such that fracturing fluid near a fracture tip has a higher differential mobility than fracturing fluid near the wellbore.

2. A method for fracturing a subterranean formation comprising the steps of:

injecting fluid into a wellbore at a pressure greater than the minimum rock stress;

creating differential mobility within said fluid such that the near-tip fluid has higher differential mobility; and allowing near-tip fracturing fluid to move towards said wellbore.

3. A method for fracturing a subterranean formation comprising the steps of:

injecting fluid into a wellbore at a pressure greater than the minimum in situ rock stress, thereby creating a fracture;

co-injecting with said fluid, at least one breaker to induce a mobility differential within said fracture along the direction of said fracture;

allowing said fluid to migrate towards said wellbore in response to said mobility differential.

4. The method of claim 3 wherein said mobility differential is a viscosity gradient.

5. The method of claim 3 wherein said mobility differential is a density gradient.

6. The method of claim 3 wherein said mobility differential is both a viscosity gradient and a density gradient.

7. A method for fracturing a subterranean formation comprising injecting a heterogeneous sequence of breakers into a wellbore at pressures greater than the minimum in situ rock stress, thereby creating a fracture, wherein said breakers induce a mobility differential.

8. The method of claim 7 wherein said heterogeneous fluid consists of at least a first stage and a second stage.

9. The method of claim 8 wherein said first stage is comprised of a proppant-carrying matrix, a high-activity breaker, and a gas.

10. The method of claim 8 wherein said second stage is comprised of a proppant-carrying matrix, a lower-activity breaker, and a means for controlling proppant flowback.

11. The method of claim 8 wherein said first stage is comprised of a proppant-carrying matrix, and an encapsulated bromate breaker.

12. The method of claim 11 wherein said first stage further comprises a member selected from the group consisting of nitrogen, air, and carbon dioxide.

13. The method of claim 12 wherein said encapsulated bromate breaker is present in said fluid at a concentration of about 2 pounds per 1000 gallons of fluid.

14. The method of claim 13 wherein said second stage is in turn comprised of a proppant-carrying matrix, and an encapsulated bromate breaker.

15. The method of claim 14 wherein said encapsulated bromate breaker is present in said fluid at a concentration of about one pound per 1000 gallons of fluid.

16. The method of claim 15 further comprising a third stage.

17. The method of claim 16 further comprising a fourth stage.

18. The method of claim 17 further comprising a fifth stage.

19. The method of claim 18 further comprising a sixth stage.

20. The method of claim 19 further comprising a seventh stage.

21. The method of claim 20 further comprising an eighth stage.

22. The method of claim 21 further comprising a ninth stage.

23. The method of claim 22 wherein said third through ninth stage contain the same or different breakers, and if the same, then each stage has a lower breaker activity than the previous stage.

24. The method of claim 15 further comprising a final stage.

25. The method of claim 24 wherein said final stage is in turn comprised of a proppant-carrying matrix, a breaker, and a means for controlling proppant flowback.

26. The method of claim 25 wherein said means for controlling proppant flowback is selected from the group consisting of natural organic fibers, platelets, or fibers and platelets; synthetic organic fibers, platelets, or fibers and platelets; ceramic fibers, platelets, or fibers and platelets; inorganic fibers, platelets, or fibers and platelets; metal fibers, filaments, platelets, or fibers and platelets; carbon fibers, platelets, or fibers and platelets; glass fibers, platelets, or fibers and platelets; ceramic fibers, platelets, or fibers and platelets; novoloid fibers, platelets, or fibers and platelets; novoloid-type polymer fibers, platelets, or fibers and platelets; natural polymer fibers, platelets or fibers and platelets; synthetic polymer fibers, platelets, or fibers and platelets; and mixtures thereof.

27. The method of claim 26 wherein said means for controlling proppant flowback is selected from the group consisting of novoloid fibers, platelets, or fibers and platelets; novoloid-type polymer fibers, platelets, or fibers and platelets; and mixtures thereof.

28. The method of claim 7 further comprising the step of: within one hour after creating said fracture, opening said wellbore and allowing said fluid to flow back thereby rapidly lowering pressure in said fracture.

29. The method as in any of claims 1–7 wherein said fluid is comprised of at least a first, a second, and a third stage, and wherein said at least three stages are sequentially injected into said wellbore beginning with said first stage, and wherein:

said first stage is comprised of a proppant-carrying matrix, a first breaker, and a member selected from the group consisting of gas, foam, and energized fluid;

said second stage is comprised of a means for controlling proppant flowback, a proppant-carrying matrix, and a second breaker; and wherein said first breaker is the same or different than said second breaker, and if the same, then the concentration of said first breaker is greater than the concentration of said second breaker.

30. The method of claim 29 further comprising the step of within one hour after creating said fracture, opening said wellbore and allowing said fluid to flow back thereby rapidly lowering pressure in said fracture.

31. A method for fracturing a subterranean formation comprising injecting through a wellhead into a wellbore, a foamed fracturing fluid thereby creating a fracture, said fluid in at least one early stage containing proppant, injecting into said wellbore, means for controlling proppant flowback in at least one later stage, opening said wellhead soon after completion of pumping to allow flowback and thereby forcing closure of said fracture.

32. A method for fracturing a subterranean formation according to a pumping schedule to achieve differential mobility, comprising:

injecting a fracturing fluid containing proppant into said formation, thereby creating a fracture, wherein said fluid has greater mobility than subsequent stages upon end of treatment; thereafter, injecting a means for controlling proppant flowback into said formation; thereafter, promoting aggressive flowback by forced closure.

33. The method of claim 32 wherein said fluid is combined with a gas prior to injecting, said gas selected form the group consisting of nitrogen, carbon dioxide, and air.

* * * * *